W. H. GRIFFITH.
CHUCK.
APPLICATION FILED JULY 13, 1916.
1,263,058.
Patented Apr. 16, 1918.
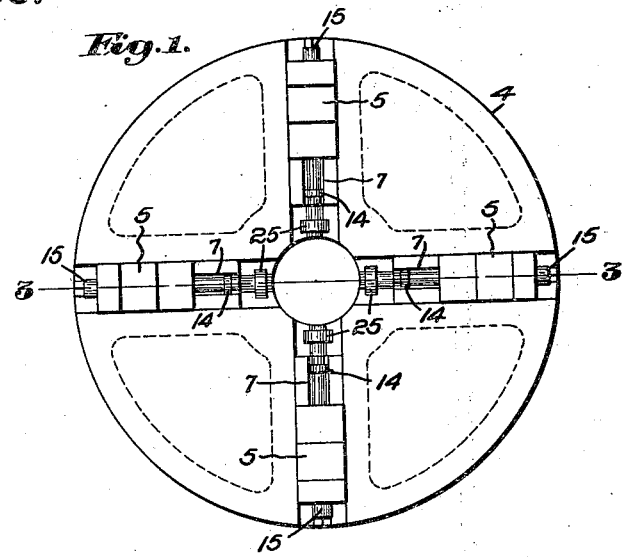
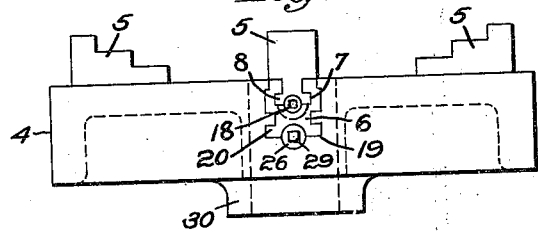
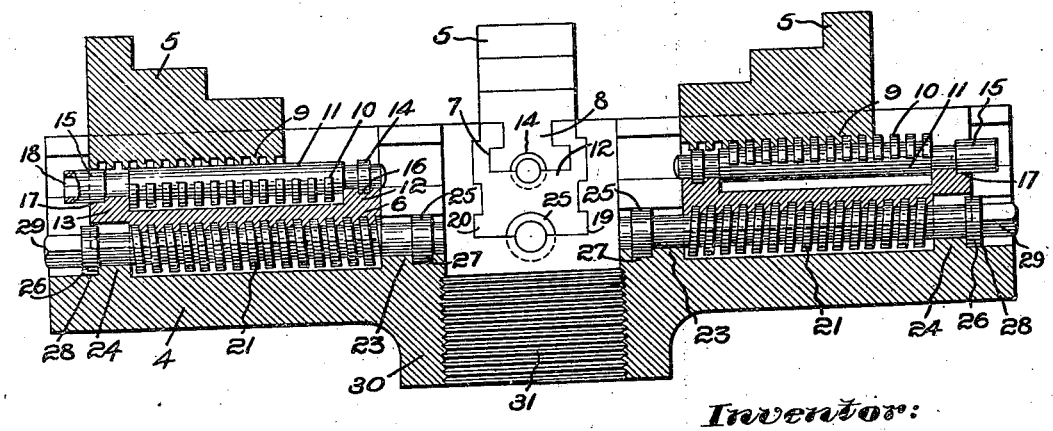
Inventor:
William H. Griffith.
by Emery, Booth, Janney & Varney.
Attys.

UNITED STATES PATENT OFFICE.

WILLIAM H. GRIFFITH, OF SOMERVILLE, MASSACHUSETTS.

CHUCK.

1,263,058.  Specification of Letters Patent.  Patented Apr. 16, 1918.

Application filed July 13, 1916. Serial No. 109,025.

*To all whom it may concern:*

Be it known that I, WILLIAM H. GRIFFITH, a citizen of the United States, and a resident of Somerville, county of Middlesex, and State of Massachusetts, have invented an Improvement in Chucks, of which the following description, in connection with the accompanying drawings, is a specification, like characters on the drawings representing like parts.

This invention relates to chucks, vises, and similar work for tool clamping devices and is more especially concerned with rapid adjusting means to effect a saving of time in the placing of the work or tool in the chuck and in adapting the latter to various sizes of pieces to be held.

My invention will be best understood by reference to the following description when taken in connection with the accompanying drawings of one specific embodiment thereof, while its scope will be more particularly pointed out in the appended claims.

In the drawings:

Figure 1 is a front elevation or face-view of a chuck embodying my invention;

Fig. 2 is a plan or edge view of the same; and

Fig. 3 is a sectional view on an enlarged scale on a line 3—3 of Fig. 1.

Referring to the drawings and to the embodiment of my invention which I have selected for illustration, I have there shown a chuck of the rotary type such as is used for lathes, the same having a cylindrical face-plate 4 constituting a support or base for a plurality of work-engaging members 5. The latter may be of any suitable number according to the character of the work which is to be performed. In some cases chucks are provided with two jaws, some with three, and others with four, the latter type being the one which is selected for illustration in the present instance. The work-engaging members or jaws 5 are herein arranged in pairs, the members of each pair working in a radial direction and one pair being arranged in a plane at right angles to the other.

In the operation of chucks heretofore, much time has been lost in adjusting the jaws especially when making a change from a small piece of work to a large one, and since this part of the time spent in manufacture is non-productive, it is highly desirable in these days of endeavor to secure efficiency and economical methods of handling work, that the time required for adjusting a chuck to its work be reduced as much as possible. To this end, therefore, I have provided means whereby a quick parallel adjustment of the jaws may be made followed by a final adjustment and clamping action.

In the present embodiment of my invention each of the jaws 5 is mounted upon a carrier 6 to which it may be secured in various positions of radial adjustment by appropriate means. In the present instance each jaw 5 has suitable interlocking engagement with its carrier whereby it can move radially with relation thereto but is positively held against movement in other directions. To this end each carrier 6 is herein provided with a T-shaped lug or tongue 8 formed on the jaw 5. As a means for locking each jaw in various positions of radial adjustment with respect to its jaw carrier, said jaw is provided with one or more, herein a plurality, of teeth 9 engageable with one or more teeth 10 on a locking member 11. While a single tooth on one part coöperating with a series of teeth on another, might give fairly satisfactory results, such single tooth to be of sufficient strength would necessarily have to be so large as to reduce the number of definite positions of adjustment of the jaw with respect to its carrier. By providing each of the two coöperating parts with a plurality of teeth, the latter can be made small in size since their total shearing strength will be equal to that of one very large tooth.

The locking member 11 may take other forms but herein consists of a shaft provided with a circular toothed rack the teeth of which extend part way only about any circumference herein 180°, the other 180° of the shaft preferably having a diameter equal to that of the spaces between the teeth. The shaft 11 is herein supported in half bearings 12 and 13 at its ends and is provided with suitable shoulders 14 and 15 engaging grooves 16 and 17 respectively, whereby the shaft is held against axial movement. It should here be observed that the jaw 5 constitutes an upper bearing for the shaft and holds the latter in its lower bearings, it being evident that the shaft can be removed only after the jaw has been entirely withdrawn from its T slot.

As a means for facilitating rotation of the shaft its outer end is herein provided with a polygonal socket 18 to receive a suitable wrench. When the teeth of the shaft are engaged with those of the jaw as illustrated at the right hand side of Fig. 3, the jaw is positively locked against endwise movement but by simply turning the shaft one-half rotation to the position illustrated at the left-hand side of Fig. 3, the jaw is unlocked and can be moved freely to and fro in a radial direction. By this means a parallel adjustment can be effected after which the jaw will again be locked by rotating the shaft another half turn. Thus it will be evident that when a piece is to be placed in a chuck the jaws may be adjusted instantly to very nearly the required position.

The jaw carriers 6 are mounted to move radially but are prevented from moving in other directions with relation to the faceplate or base 4 in any suitable manner as by providing the latter with a slot 19 of T or other suitable cross-sectional shape to receive a correspondingly shaped lug or tongue 20 on the jaw carrier. The latter may be provided with any suitable means of adjustment herein a radially disposed screwthreaded shaft 21 engaging a half nut 22 suitably formed on or secured to the jaw carrier. The shaft 21 is mounted in suitable half bearings 23 and 24 and is herein provided at its ends with shoulders 25 and 26 engaging grooves 27 and 28 respectively whereby the shaft is held against endwise movement but is permitted to turn for the purpose of moving the jaw carriers radially. It should here be observed that the jaw carrier 6 provides an upper bearing for the shaft 21 and holds the latter in its lower bearings 23 and 24 until such time as the jaw carrier is withdrawn from its slot.

As a means for facilitating rotation of the shaft 21 to effect radial adjustment of the jaw carrier and to clamp the work between the jaws, said shaft is herein provided with a polygonal head 29 to receive a suitable wrench.

It must now be evident that having made a preliminary adjustment of the jaws by moving them with respect to their jaw carriers, the latter may be moved in the proper direction to effect the final adjustment and clamp the work between the jaws. It is obvious that work pieces of large or small size may be accommodated and changed from one to the other with a rapidity which is altogether impossible in the use of a chuck having simply the usual screw or scroll adjusting means.

The form of chuck herein selected for illustration is adapted for use on a lathe or milling machine and to that end is herein provided with a central boss or hub 30 having a threaded aperture 31 to receive a correspondingly threaded spindle of the machine tool on which it is to be placed. This invention, however, is by no means limited to chucks of the rotatable type but it is adaptable to planer and other chucks as well as bench and hand vises.

While I have herein shown and described one form or embodiment of my invention for illustrative purposes and have disclosed and discussed in detail the construction and arrangement incidental to one specific application thereof, it is to be understood that the invention is limited neither to the mere details nor to the relative arrangement of parts nor to its specific embodiment herein shown, but that extensive deviations from the illustrated form or embodiment of the invention may be made without departing from the principle thereof.

Having thus described one embodiment of my invention, what I claim as new and desire to secure by Letters Patent, is:

1. A chuck or vise comprising, in combination, a base provided with a plurality of radial grooves, a plurality of sliding jaw-carriers, one mounted in each groove and having interlocking connection with said base, a plurality of radial screws one for each jaw-carrier and having threaded engagement therewith to move the latter radially, a plurality of jaws, one for each carrier, each jaw being mounted to move radially on its respective jaw-carrier, and having interlocking connection therewith, and a plurality of radial jaw-locking shafts, one for each jaw, each shaft being provided with a circular toothed rack the teeth of which extend part way only about its circumference, and each coöperating jaw being provided with one or more teeth engageable with the teeth of such rack.

2. A chuck or vise comprising, in combination, a base provided with a plurality of radial grooves, a plurality of sliding jaw-carriers, one mounted in each groove and having interlocking connection with said base, a plurality of radial screws, one for each jaw-carrier and having threaded engagement therewith to move the latter radially, a plurality of jaws, one for each carrier, each jaw being mounted to move radially on its respective jaw-carrier and having interlocking connection therewith, and a plurality of radial jaw-locking shafts, one for each jaw, each coöperating jaw and shaft being provided with coöperating teeth to lock such jaw in various positions of radial adjustment with respect to its jaw-carrier.

3. A chuck or vise comprising, in combination, a base provided with a plurality of radial grooves, a plurality of sliding jaw-carriers, one mounted in each groove, a plurality of radial screws, one for each jaw-carrier and having threaded engagement therewith to move the latter radially, a plurality of jaws, one for each carrier, each jaw being mounted to move radially on its respective jaw-carrier and having tongue and groove connection therewith, and a plurality of radial jaw-locking shafts, one for each jaw, each shaft being provided with one or more teeth, and each jaw being provided with a plurality of teeth engageable with the tooth or teeth of the coöperating shaft to lock the jaw in various positions of adjustment with respect to its jaw-carrier.

4. A chuck or vise comprising, in combination, a base provided with a plurality of radial grooves, a plurality of slides, one mounted in each groove, a plurality of radial screws one for each slide, each screw having threaded connection with its respective slide to move the latter radially, a plurality of jaws, one for each carrier, each jaw being mounted to move radially on its respective slide, and a plurality of radial jaw-locking shafts, one for each jaw, each said shaft being provided with locking and unlocking means to interlock with its respective jaw in a plurality of positions of adjustment of the latter and having provision to unlock and permit such jaw to be moved freely on its slide.

5. In a chuck or vise, the combination of two or more abutments one of which is adjustable toward and from the other, a carrier on which the adjustable abutment is mounted for movement toward and from the other abutment, locking and unlocking means releasably to secure said adjustable abutment to said carrier in the selected position of adjustment with reference thereto, and means to move said carrier to carry said adjustable abutment therewith toward and from the other abutment.

6. A clamping device comprising, in combination, a pair of opposed work-engaging members, a carrier on which one of said members is mounted for adjustment toward and from the other, releasable means at will to secure such member in the desired position of adjustment with reference to said carrier, and means to move said carrier toward the other member to clamp the work between said members.

7. A clamping device comprising, in combination, a pair of opposed work-engaging members, a carrier on which one of said members is slidably mounted for adjustment toward and from the other, releasable means at will to secure such member in the desired position of adjustment with reference to said carrier, and means to move said carrier toward and from the other member and to lock said carrier against accidental movement.

8. A clamping device comprising, in combination, a pair of opposed work-engaging members, a carrier on which one of said members is slidably mounted for preliminary adjustment toward and from the work, means releasably to secure such member in the selected position of adjustment, and means to effect a final adjustment and clamp the work between said members.

9. A clamping device comprising, in combination, a pair of opposed work-engaging members, means for obtaining a preliminary quick-adjustment of one of said members with relation to the other, means releasably to secure such member in the selected position of adjustment, and means for obtaining a final relatively slow and powerful adjustment and clamping action of the work-engaging members against the work.

10. A clamping device comprising, in combination, a pair of work-engaging members, means for obtaining a preliminary quick-adjustment of and to lock one of said members with respect to such adjustment, means releasably to secure such member in the selected position of adjustment, and means for obtaining a final relatively slow and powerful adjustment of and to lock such member with respect to the work.

In testimony whereof I have signed my name to this specification.

WILLIAM H. GRIFFITH.

Copies of this patent may be obtained for five cents each, by addressing the "Commissioner of Patents, Washington, D. C."